(12) United States Patent
Gupta et al.

(10) Patent No.: US 6,655,632 B1
(45) Date of Patent: Dec. 2, 2003

(54) SYSTEM AND METHOD FOR ACTIVELY CHANGING AN EFFECTIVE FLOW-THROUGH AREA OF AN INLET REGION OF AN AIRCRAFT ENGINE

(75) Inventors: Anurag Gupta, Clifton Park, NY (US); Paolo Graziosi, Clifton Park, NY (US); Ramani Mani, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/064,884

(22) Filed: Aug. 27, 2002

(51) Int. Cl.[7] .................. B64C 23/06; B64C 7/02
(52) U.S. Cl. .................. 244/53 B; 244/1 N
(58) Field of Search .................. 244/1 N, 53 B; 415/119; 181/214, 219

(56) References Cited

U.S. PATENT DOCUMENTS

| | | | |
|---|---|---|---|
| 2,604,278 A | * | 7/1952 | Johnson .................. 244/53 B |
| 2,971,329 A | * | 2/1961 | Barry .................. 137/15.2 |
| 3,664,612 A | * | 5/1972 | Skidmore et al. .......... 244/53 B |
| 4,641,678 A | | 2/1987 | Haas et al. |
| 5,014,933 A | | 5/1991 | Harm et al. |
| 5,136,837 A | | 8/1992 | Davison |
| 5,478,199 A | | 12/1995 | Gliebe |
| 5,517,865 A | | 5/1996 | Wisler et al. |
| 5,619,855 A | | 4/1997 | Burrus |
| 5,681,013 A | | 10/1997 | Rudolph |
| 5,899,061 A | | 5/1999 | Bouchez et al. |
| 5,916,127 A | | 6/1999 | Papamoschou |
| 6,021,637 A | | 2/2000 | Scavo |
| 6,129,309 A | | 10/2000 | Smith et al. |
| 6,179,251 B1 | * | 1/2001 | Tindell et al. .............. 244/207 |
| 6,276,632 B1 | | 8/2001 | Sanders et al. |
| 6,308,740 B1 | | 10/2001 | Smith et al. |
| 6,336,319 B1 | | 1/2002 | Koshoffer |
| 6,390,418 B1 | | 5/2002 | McCormick et al. |

OTHER PUBLICATIONS

S.B. Svirschevski, L.G. Artamonova, A.N. Radzig & N.V. Semenchikov, "Control of Aerodynamic Characteristics of Airfoils and Wing Systems in Subsonic Flow", SAE The Engineering Society for Advancing Mobility Land Sea Air and Space, 2001–01–2946, Sep. 10–14, 2001, pages.
U.S. patent application Publication US 2002/0079405, Jun. 27, 2002, Layukallo.

* cited by examiner

Primary Examiner—Robert P. Swiatek
(74) Attorney, Agent, or Firm—Penny A. Clark; Patrick K. Patnode

(57) ABSTRACT

An active effective flow-through area control system includes an upstream wall-flow perturber and a downstream wall-flow perturber situated in an inlet region of an aircraft engine. The downstream wall-flow perturber is positioned downstream from the upstream wall-flow perturber. The upstream and downstream wall-flow perturbers are configured to generate and trap at least one region of separated, vortical flow in the airflow through the inlet region. A method, for actively changing an effective flow-through area of an inlet region of an aircraft engine, includes creating at least one region of separated, vortical flow in an airflow passage defined by the inlet region. The method further includes trapping the region of separated, vortical flow in the airflow passage. The region of separated, vortical flow partially obstructs a main inlet airflow.

30 Claims, 7 Drawing Sheets

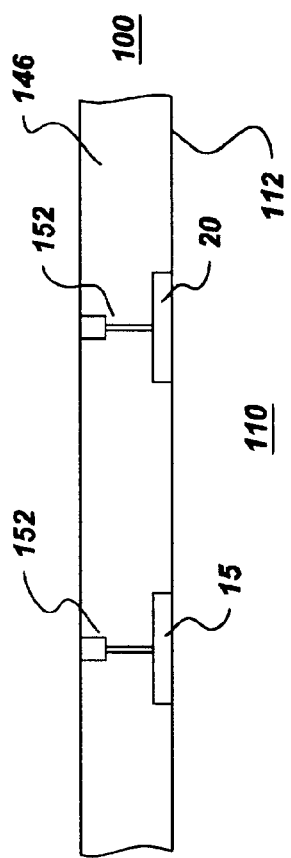
*Fig. 5*
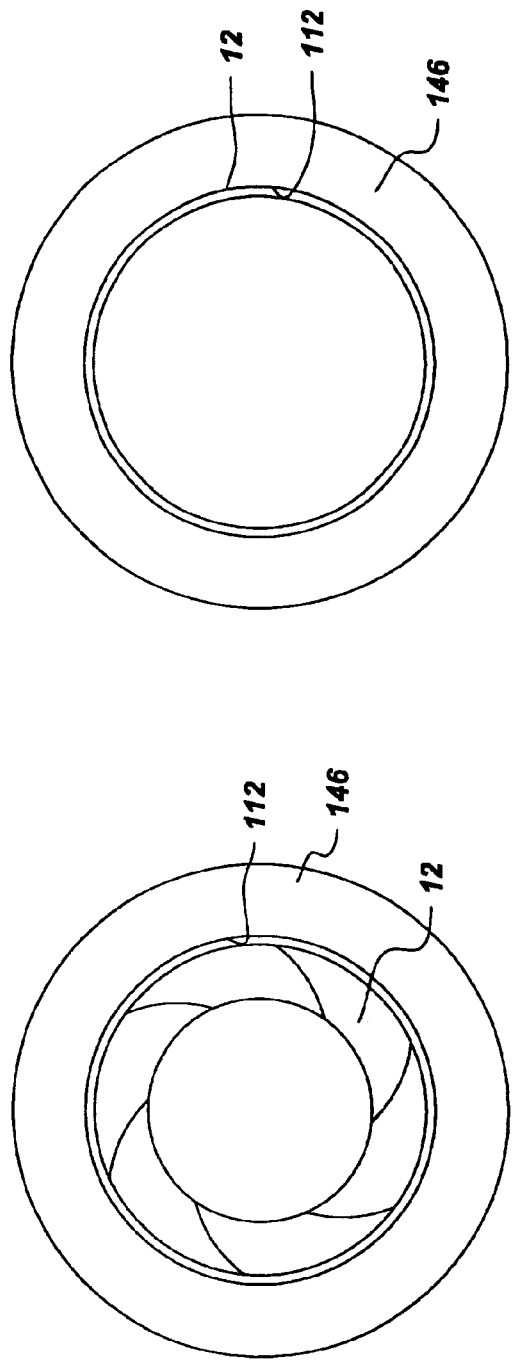
*Fig. 6A*
*Fig. 6B*

US 6,655,632 B1

SYSTEM AND METHOD FOR ACTIVELY CHANGING AN EFFECTIVE FLOW-THROUGH AREA OF AN INLET REGION OF AN AIRCRAFT ENGINE

BACKGROUND OF INVENTION

The invention relates generally to an inlet of an aircraft engine and, more particularly, to a system and method for actively changing an effective flow-though area of the inlet, to vary the Mach number of airflow through the inlet.

The amount of noise that is generated by an aircraft engine during the takeoff and landing of an aircraft continues to be a concern and is often limited by government regulation. Sources of noise for aircraft engines include fan and inlet noise. Accordingly, it would be desirable to develop a system and a method for reducing fan and inlet noise during takeoff and landing operations. It would further be desirable for the system and method to avoid reducing performance characteristics of the aircraft engine during the remainder of the flight.

SUMMARY OF INVENTION

Briefly, in accordance with one embodiment of the present invention, an active effective flow-though area control system includes an upstream wall-flow perturber and a downstream wall-flow perturber situated in an inlet region of an aircraft engine. The downstream wall-flow peturber is positioned downstream from the upstream wal-flow perturber. The upstream and downstream wall-flow peturbers are configured to generate and trap at lease one region of separated, vortical flow in the airflow through the inlet region.

For another embodiment of the invention, a variable effective flow-through area inlet of an aircraft engine is disclosed. The variable effective flow-through area inlet includes an inner wall defining an airflow passage and an upstream and a downstream wall-flow perturber connected to the inner wall. The upstream and downstream wall-flow perturbers are configured to generate and trap at least one region of separated, vortical flow in the airflow within the airflow passage.

A method embodiment, for actively changing an effective flow-through area of an inlet region of an aircraft engine, is also disclosed. The method includes creating at least one region of separated, vortical flow in an airflow passage defined by the inlet region. The method further includes trapping the region of separated, vortical flow in the airflow passage. The region of separated, vortical flow partially obstructs a main inlet airflow.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 5 shows the portion of the exemplary active effective flow-through area control system illustrated in FIG. 3, with an upstream and a downstream wall-flow perturber retracted, so as not to impede airflow;

FIGS. 6A and 6B are cross-sectional views of a iris diaphragm embodiment of the upstream and downstream wall-flow perturbers, the iris diaphragm being respectively extended and retracted;

DETAILED DESCRIPTION

Figure 1:
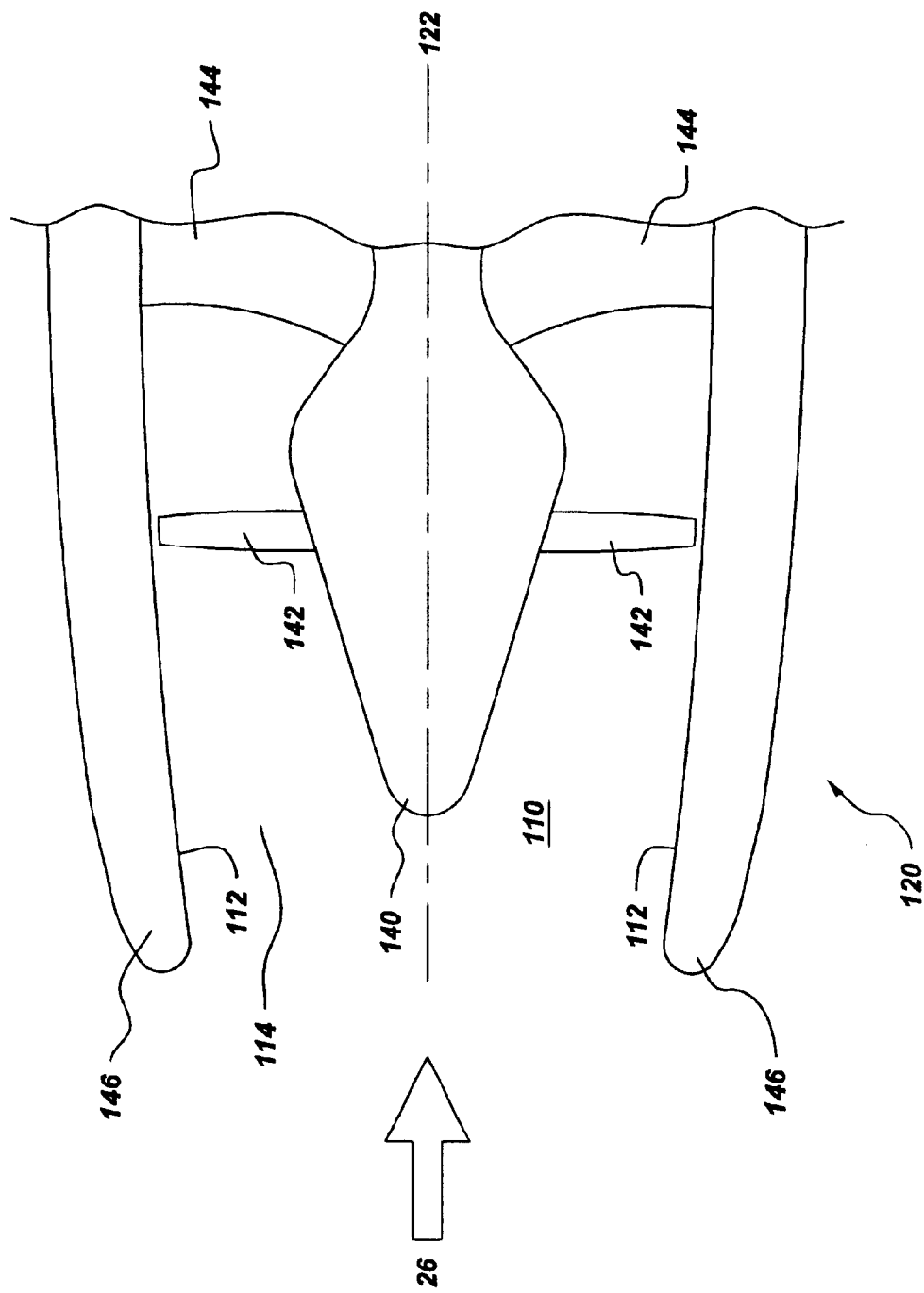
FIG. 1 is a longitudinal, partly sectional, schematic representation of a forward portion of an exemplary turbofan aircraft engine.

By way of background, a forward portion of an exemplary aircraft turbofan engine 120 is described with reference to FIG. 1. Aircraft engine 120 includes a spinner 140, which is configured to rotate fan, or rotor, blades 142 about longitudinal centerline axis 122. Surrounding fan blades 142 is a nacelle 146, which includes an inner wall 112 defining an inlet region 110. Ambient air 26 flows into inlet region 110 during operation of aircraft engine 120. A number of circumferentially spaced apart outlet guide vanes (OGVs), or stator vanes, 144 extend radially about longitudinal centerline axis 122 and are spaced axially downstream from rotor blades 142.

During operation of aircraft engine 120, rotor blades 142 are caused to rotate about centerline axis 122 by a core engine (not shown). It is known that rotation of rotor blades 142 generates loud noise, which may be objectionable during takeoff and landing operations of aircraft engine 120. It is an object of the present invention to reduce noise during takeoff and landing operations of the aircraft engine.

An active effective flow-through area control system 100 is described with reference to FIGS. 2 and 3. As shown in FIG. 3, active effective flow-through area control system 100 includes an upstream wall-flow perturber 15 and a downstream wall-flow perturber 20 situated in an inlet region 110 of an aircraft engine 120. As shown, downstream wall-flow perturber 20 is positioned downstream from upstream wall-flow perturber 15. Upstream and downstream wall-flow perturbers are configured to generate and trap at least one region of separated vortical flow 150 in the airflow through inlet region 110, as exemplarily shown in FIG. 3. As indicated in FIG. 3, the separated, vortical flow 150 is trapped in a vicinity of the area between upstream and downstream wall-flow perturbers 15, 20. The resulting region of separated vortical flow 150 obstructs incoming airflow through inlet region 110, reducing the effective flow-through area of inlet region 110 and thereby increasing the local Mach number of the airflow in inlet region 110. Beneficially, higher local Mach numbers for inlet region 110 reduce the noise radiated upstream from the engine core (not shown), reducing the noise of aircraft engine 120 heard on the ground.

Figure 10:
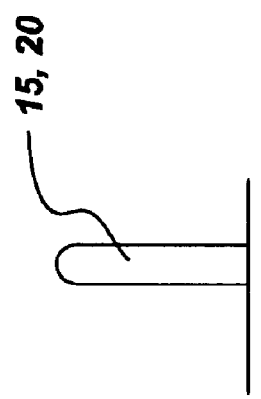
FIG. 10 depicts an exemplary wall-flow perturber having an elliptical or rounded configuration.
Figure 9:
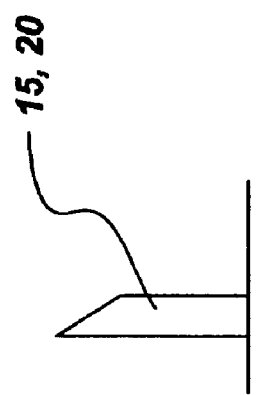
FIG. 9 illustrates an exemplary wall-flow perturber having a trapezoidal cross-section.
Figure 8:
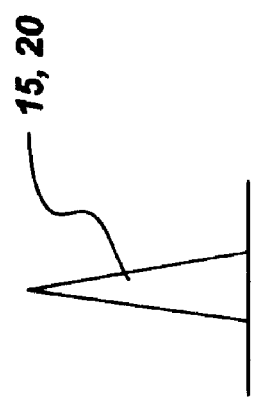
FIG. 8 depicts an exemplary wall-flow perturber having a triangular cross-section.

For the embodiment illustrated in FIG. 3, each of the upstream and downstream wall-flow perturbers 15, 20 is in the form of a deployable obstruction. As used here, the term "obstruction" indicates a physical obstruction, such as a baffle. Further, as used here, the term "deployable obstruction" means that the obstruction is actuated for extending and retracting. As indicated in FIG. 3, the deployable obstructions are configured to reduce an effective flow-through area in a vicinity of the area spanning a respective upstream and downstream position 101, 102 in the inlet region 110 by creating and trapping at least one region of separated, vortical flow 150 in the inlet region 110. The effective flow-through area is minimal at a point between wall-flow perturbers 15, 20. By "configured," it is meant here that the overall geometry of the wall-flow perturbers 15, 20, such as their height h and the distance d between them, are selected to create and trap the region of separated, vortical flow. Height h and distance d are indicated in FIG. 2. According to a particular embodiment, the deployable obstructions wall-flow perturbers 15, 20 are configured to extend into inlet region 110 less than about ten percent of radius 116 of inlet region 110, and more particularly to extend about two to about ten percent of radius 116, and still more particularly to extend about three to about five percent of radius 116 when activated. Radius 116 is indicated in FIG. 4. Exemplary deployable obstructions, which are shown as baffles in FIG. 3, extend about four percent of radius 116 into inlet region 110 when activated. Although the deployable obstructions have been described for the rectangular embodiment shown, deployable obstructions also may have other cross-sectional and planform shapes, for example triangular, trapezoidal, or elliptical, as indicated, for example, in FIGS. 8, 9 and 10, respectively.

As shown for example in FIG. 4, each of the wall-flow perturbers 15, 20 includes at least one baffle 11, according to a particular embodiment. As explained above, each of the wall-flow perturbers 15, 20, here annular arrangements 13 of baffles 11, is actuated for extending and retracting. More particularly, for the embodiment illustrated in FIG. 4, each of upstream and downstream wall-flow perturbers 15, 20 includes an annular obstruction 13 extending from an inner wall 112 of inlet region 110. Each annular obstruction 13 includes at least two baffles 11 and, more particularly, extends around inner wall 112, as indicated in FIG. 4. Increasing the number of baffles 11 is advantageous with respect to airflow and actuation considerations. Accordingly, for a particular embodiment each annular obstruction 13 includes at least four baffles 11 and, for the particular embodiment shown in FIG. 4, includes eight baffles 11. Exemplary baffles 11 are formed of light-weight alloys, for example of titanium or aluminum-lithium alloys, or composites.

According to a more particular embodiment illustrated in FIG. 5, each baffle 11 is actuated for extending and retracting using actuation means 152. One exemplary actuation means is a push rod 152, as indicated in FIGS. 3 and 5, linked to a pneumatic, hydraulic or electromechanical actuator (not shown). Thus, actuated push rods 152 may be used to extend (deploy) and retract upstream and downstream wall-flow perturbers 15, 20, as indicated in FIGS. 3 and 5. Beneficially, actuation means 152 facilitates the extension (deployment) of upstream and downstream wall-flow perturbers 15, 20 prior to or during aircraft (not shown) takeoff and landing, when the reduction of engine noise is desirable, and the retraction of the wall-flow perturbers 15, 20 for the remainder of the flight time, when performance issues are more important than noise. According to a particular embodiment illustrated in FIG. 5, upstream and downstream wall-flow perturbers 15, 20 are flush with inner wall 112 when retracted, to maintain engine performance.

Another embodiment of upstream and downstream wall-flow perturbers 15, 20 is illustrated in FIGS. 6A and 6B. For this embodiment, the wall-flow perturbers take the form of deployable obstructions, with each of the deployable obstructions being a lens shutter type obstruction or iris diaphragm 12 (referred to hereafter as "iris diaphragm"). For this type of deployable obstruction, "deployable" means that the obstruction is actuated to extend into inlet region 110 and to retract to form an open configuration, as shown for example in FIGS. 6A and 6B, respectively. More particularly, FIG. 6A shows iris diaphragm 12, when extended into inlet region 110 for creation of the region of separated, vortical flow 150. Desirably, iris diaphragm 12 can be extended prior to or during takeoff and landing operations of aircraft engine 120, to increase the local Mach number of airflow in inlet region 110, thereby attenuating fan and inlet noise. FIG. 6B shows iris diaphragm 12, when retracted to remove or reduce the impact of iris diaphragm 12 on airflow through inlet region 110 during the remainder of the flight, for example at cruising altitude. The retraction of iris diaphragm 12 at cruising altitude reduces the negative impact of active inlet area control system 100 on engine performance criteria.

In order to control attachment of the airflow downstream of downstream wall-flow perturber 20 and to protect fan blades 142 from impingement of disturbed airflow, active effective flow-through area control system 100 according to a particular embodiment, further includes a suction system 30 positioned in inlet region 110 of aircraft engine 120 downstream from downstream wall-flow perturber 20. As indicated in FIG. 3, suction system 30 is configured to apply suction to the airflow in the inlet region 110 downstream from downstream wall-flow perturber to reattach and control the region of separated, vortical flow 150. Beneficially, suction system 30 provides airflow control, helping to constrain vortex 150 to the vicinity of upstream and downstream wall-flow perturbers 15, 20, thereby protecting downstream engine components, such as fan blades 142 and the compressor (not shown), from inlet airflow distortions. More particularly, suction system 30 provides airflow control in variable conditions, obviating any need to adjust the configuration of the upstream and downstream wall-flow perturbers 15, 20, for example to adjust the distance between upstream and downstream wall-flow perturbers 15, 20, to compensate for changes in airflow conditions such as speed, pressure or angle of flight. For example, when the region of separated, vortical flow becomes untrapped, that is when the region of separated vortical flow fails to reattach to inner wall 112 downstream of downstream wall-flow perturber 20 in response to a change in airflow conditions, the application of suction downstream from downstream wall-flow perturber 20 causes the separated, vortical flow to reattach, enabling downstream wall-flow perturber to trap the separated, vortical flow once again. Suction can be applied, for example, using an ejector pump (not shown) or other well-known means for applying suction.

For the embodiment shown in FIG. 3, suction system 30 includes an aspirated section 32 in an inner wall 112 of the inlet region 110. Examples of aspirated section 32 include a set of holes 33, slots (not shown), or an otherwise porous portion of wall 112 of inlet region 110. Beneficially, aspirated section 32 aids in the removal of disturbed flow from the airflow downstream from downstream wall-flow perturber 20, for protection of fan blades 142 and the compressor (not shown) from inlet distortions and to enhance the integrity of the separated, vortical flow structure trapped by wall-flow perturbers 15, 20.

For the embodiment shown in FIG. 3, active effective flow-through area control system 100 further includes a blowing system 40 positioned in inlet region 110 upstream of the upstream wall-flow perturber 15. To provide additional flexibility in determining and controlling characteristics, such as size and stability, of the region of separated, vortical flow 150, blowing system 40 is configured to blow a stream of air at an angle $\alpha$ relative to inner wall 112 into inlet region 110 upstream of the upstream wall-flow perturber 15. More particularly, blowing system 40 is configured to supply a stream of air at a pressure higher than that of the inlet airflow. Exemplary angles $\alpha$ are in a range of about 20 degrees to about–135 degrees. According to a more particular embodiment, blowing system 40 is configured to blow the stream of air at a variable angle $\alpha$ relative to inner wall 112, to provide additional flexibility to adapt to changing conditions, such as speed, pressure and angle of flight. For example, blowing system 40 includes an air outlet 208 that is rotatably configured. Variable angle $\alpha$ is adjusted by rotating air outlet 208. Such information is supplied, for example, by engine and flight control systems (not shown). Beneficially, such a variably configured blowing system 40 also reduces the aerodynamic loads on any deployable obstructions 15, 20, such as baffles 11.

An exemplary blowing system 40 includes a portion of inner wall 112 defining a flow-through portion 42. Flow through portion 42 is adapted to permit flow through inner wall 112 into inlet region 110, as indicated in FIG. 3. Examples of flow-through portion 42 include an opening, as shown in FIG. 3, a set of holes (not shown), slots (not shown) or an otherwise porous portion of inner wall 112. To blow a stream of air into inlet region 110, an exemplary blowing system 40 is configured to receive air from downstream in aircraft engine 120, for example from behind the fan rotor 142 from the compressor (not shown), or from the engine core (not shown). Means for moving air from one portion of an aircraft engine 120 to another position thereof are well known and hence are not described in detail herein. In the exemplary embodiment illustrated in FIG. 3, a pump 204 establishes a closed loop blowing/suction scheme. For this latter exemplary embodiment, an inlet 206 of pump 204 is connected to suction system 30, to remove air, and an outlet 208 of pump 204 is connected to blowing system 40, to supply air. More particularly, outlet 208 is rotatably configured to vary the angle $\alpha$ at which the air is blown by rotating outlet 208, as indicated in FIG. 3.

Figure 7:
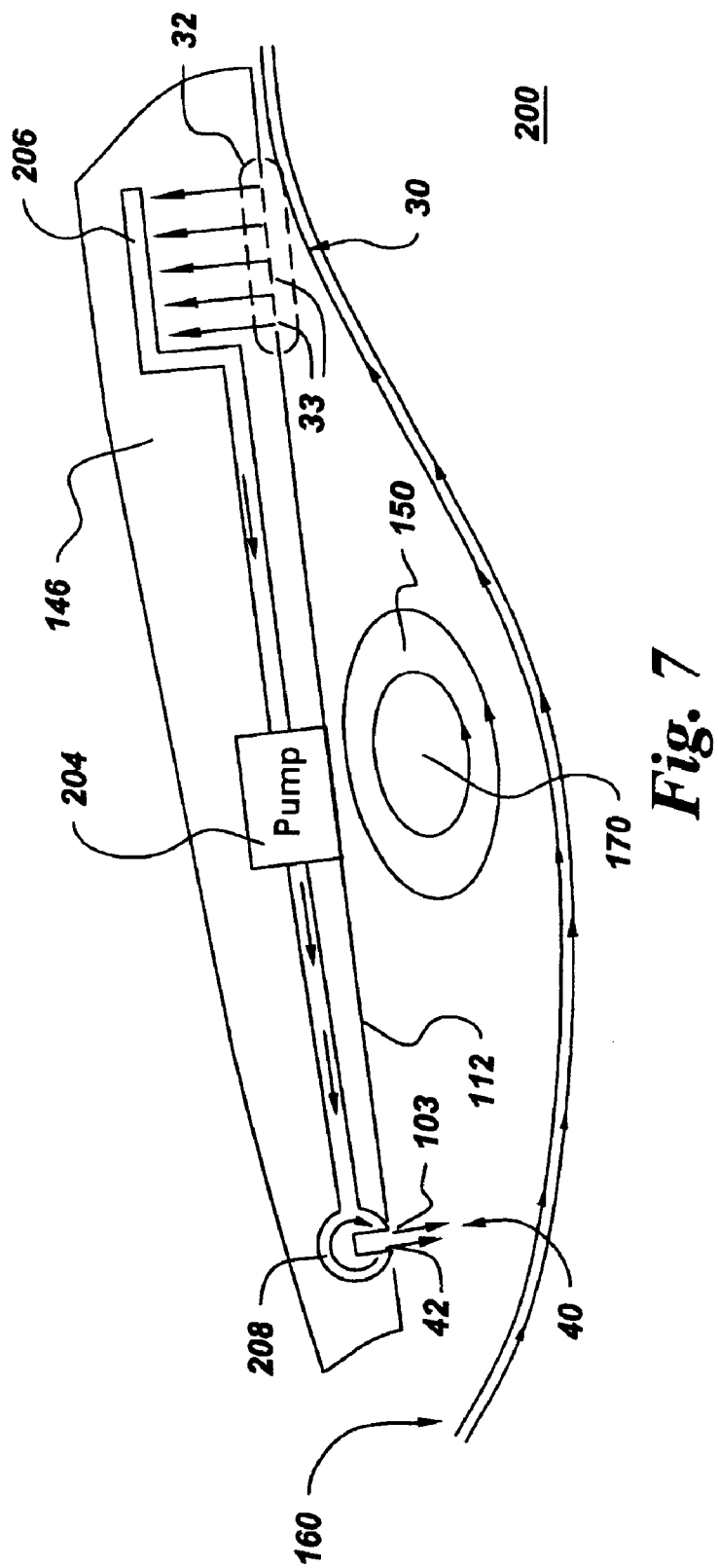
FIG. 7 illustrates a fluidic effective flow-through area control system embodiment of the invention.

A fluidic effective flow-through area control system 200 embodiment of the invention is described with respect to FIG. 7. The fluidic control system 200 for inlet region 110 of aircraft engine 120 includes blowing system 40 positioned in inlet region 110. Blowing system 40 is configured to blow a stream of air into inlet region 110 at an angle $\alpha$ relative to inner wall 112 to generate a fluidic obstruction to the airflow through inlet region 110 and generate at least one region of separated, vortical flow 150 in the airflow through inlet region 110. Fluidic control system 200 further includes suction system 30 positioned in inlet region 110 and downstream from blowing system 40. Suction system 30 is configured to apply suction to the airflow in inlet region 110 to reattach, trap and control the region of separated, vortical flow 150. For a particular embodiment, suction system 30 includes aspirated section 32 in inner wall 112 of inlet region 110, and examples thereof are provided above. More particularly, blowing system 40 is configured to vary the angle $\alpha$ at which blowing system 40 blows the stream of air, to provide additional flexibility for responding to changing airflow conditions. For another particular embodiment, blowing system 40 includes a portion of inner wall 112 defining a flow-through portion 42, and examples of flow-through portion 42 are provided above.

Figure 2:
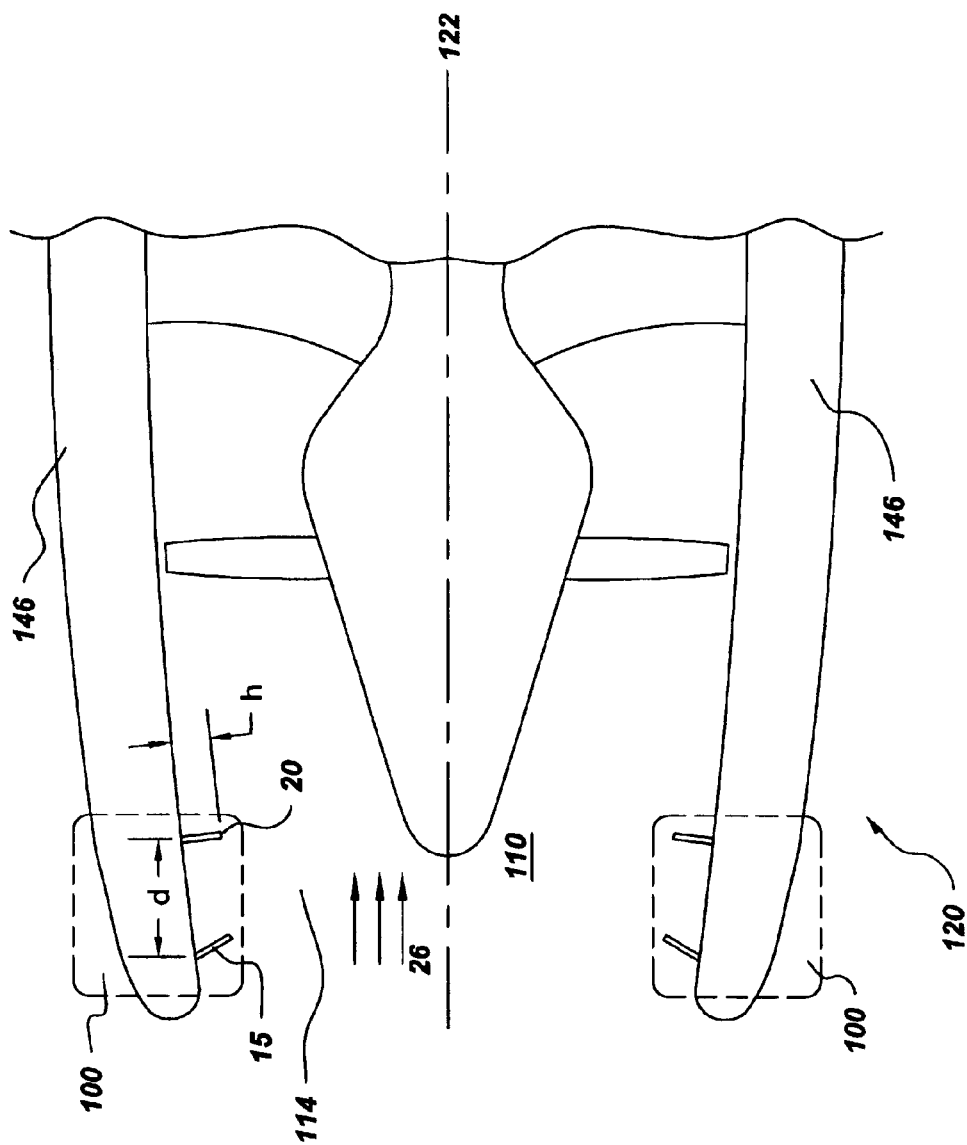
FIG. 2 is a longitudinal, partly sectional, schematic representation of a forward portion of an exemplary aircraft turbofan engine equipped with an exemplary active effective flow-through area control system.
Figure 3:
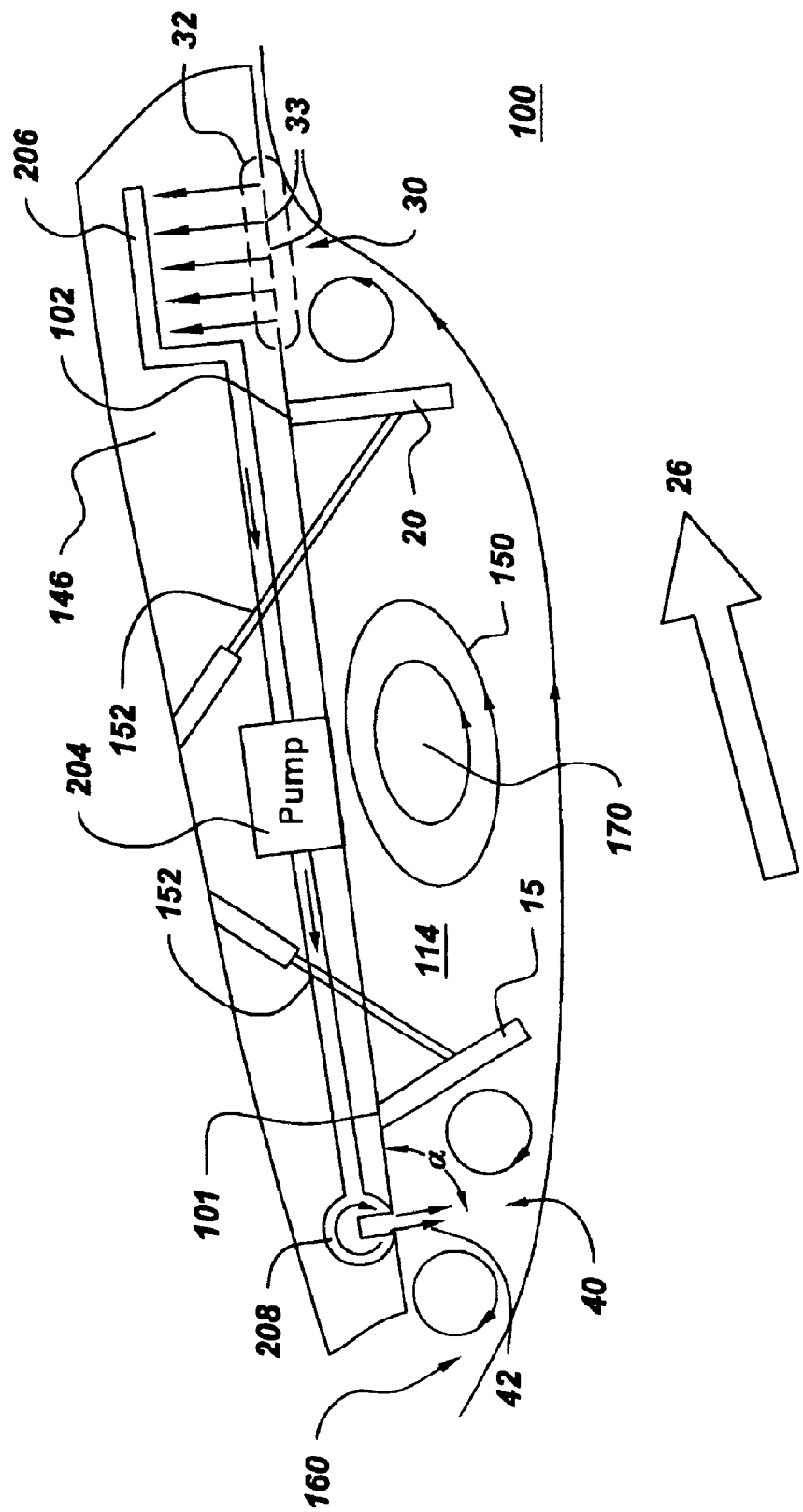
FIG. 3 is an enlarged view of a portion of the exemplary active inlet area control system of FIG. 2, which schematically illustrates the effect of the active effective flow-through area control system on the airflow in its vicinity.
Figure 4:
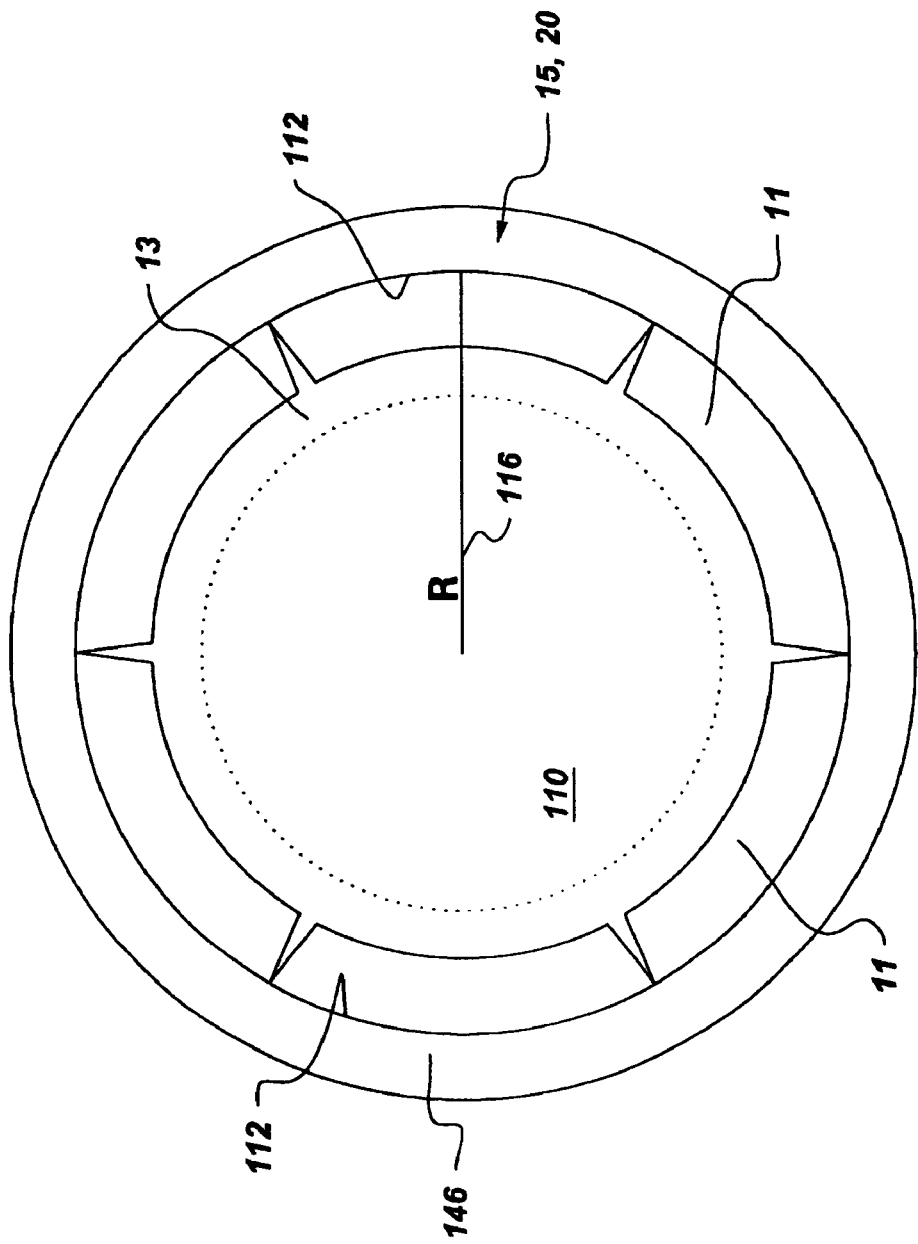
FIG. 4 is a cross-sectional view of the exemplary active effective flow-through area control system taken at an upstream position, the exemplary control system incorporating an annular arrangement of baffles.

A variable effective flow-through area inlet 110 embodiment of the invention is described with respect to FIGS. 2 and 3. Variable effective flow-through area inlet 110 of aircraft engine 120 includes an inner wall 112 defining an airflow passage 114. Variable area inlet 110 further includes upstream and downstream wall-flow perturbers 15, 20 connected to inner wall 112. Upstream and downstream wall-flow perturbers 15, 20 are configured to generate and trap at least one region of separated vortical flow 150 in the airflow within airflow passage 114. For the embodiment shown in FIG. 3, each of upstream and downstream wall-flow perturbers 15, 20 takes the form of a deployable obstruction extending from inner wall 112 into airflow passage 114. More particularly, for the embodiment shown in FIG. 3, variable effective flow-through area inlet 110 further includes a suction system 30, which is formed in inner wall 112 downstream from downstream wall-flow pertuber 20, and a blowing system 40, which is formed in inner wall 112 and positioned upstream of upstream wall-flow perturber 15. Upstream and downstream wall-flow perturbers 15, 20 and suction and blowing systems 30, 40 are described above, and repetition of detailed description of specific embodiments thereof is omitted.

Another variable effective flow-through area inlet 110 embodiment of the invention is described with reference to FIG. 7. As shown, the variable effective flow-through area inlet 110 of aircraft engine 120 includes inner wall 112, which defines airflow passage 114. Variable airflow inlet 110 further includes blowing system 40, which is formed in inner wall 112 and configured to blow a stream of air at an angle $\alpha$ relative to inner wall 112 into airflow passage 114 to generate at least one region of separated, vortical flow 150 in airflow passage 114. More particularly, blowing system 40 is further configured to vary the angle $\alpha$, at which the stream of air is blown, to provide additional flexibility to respond to changing airflow conditions, and to supply a stream of relatively high pressure air. Variable effective flow-through inlet 110 further includes suction system 30 formed in inner wall 112 downstream from blowing system 40. As discussed above, suction system 30 is configured to apply suction to the airflow in airflow passage 114 to reattach the separated flow and thereby trap and control the region of separated, vortical flow 150.

A method embodiment, for actively changing an effective flow-through area of an inlet region 110 of an aircraft engine 120, is described with reference to FIGS. 2–6. As indicated in FIG. 3, the method includes creating at least one region of separated, vortical flow 150 in airflow passage 114. As shown for example in FIG. 1, airflow passage 114 is defined by inlet region 110. The method further includes. trapping the region of separated, vortical flow 150 in airflow passage 114. The region of separated, vortical flow 150 partially obstructs a main inlet airflow, thereby reducing the effective flow-through area, as indicated, for example, in FIG. 3. As discussed above, the region of separated, vortical flow 150 can be created and trapped using upstream and downstream wall-flow perturbers 15, 20.

For another embodiment, the method further includes applying suction to the airflow downstream from a point of flow separation 160, to control the region of separated, vortical flow 150 and protect a number of fan blades 142 from the impingement of the disturbed airflow. As shown for example in FIG. 3, the point of flow separation 160 is the point at which the airflow begins to separate from flow along inner wall 112. For example, suction is applied downstream of downstream wall-flow perturber 20. As shown in FIG. 1, the fan blades 142 are positioned downstream from inlet region 110 in aircraft engine 120. As discussed above, suction can be applied to the airflow downstream from a central portion 170 of the region of separated, vortical flow 150 using suction system 30, an example of which includes aspirated region 32, as shown in FIG. 3.

According to another embodiment, the method further includes blowing a stream of air into airflow passage 114 at an angle $\alpha$ relative to inner wall 112 upstream of the central portion 170 of the region of separated, vortical flow 150, using, for example, blowing system 40, as in FIG. 3. One example of blowing system includes flow-through portion 42, defined by a portion of inner wall 112.

Because creation and trapping of the region of separated, vortical flow 150 reduces certain performance characteristics of aircraft engine 120, such as fuel efficiency, it is desirable to limit these steps to the noise-sensitive portions of the flight, such as takeoff and landing. Accordingly, for a particular embodiment, the method further includes turning off the creation and trapping of the region of separated, vortical flow 150 after one of (a) a predetermined time period has elapsed after take-off or (b) the aircraft (not shown) has reached a predetermined altitude. Both the predetermined time period and the predetermined altitude are selected such that the additional noise control achieved using the creation and trapping of the region of separated, vortical flow 150 is no longer necessary. More particularly, the creation and trapping of the region of separated, vortical flow 150 includes reducing an effective flow-through area of inlet region 110 in the vicinity of the area spanning upstream and downstream positions 101, 102, for example using baffles 11 or iris diaphragms 12 as discussed above. For this embodiment, the turning off step includes returning the effective flow-through area of inlet region 110 to an in-flight effective flow-through area in the vicinity of the area spanning upstream and downstream positions 101, 102. As discussed above with respect to FIGS. 3 and 5, actuation means 152, such as push rods 152, are used to extend and retract baffles 11. Also, iris diaphragms 12 may be used to create and trap the region of separated, vortical flow 150 and are configured to retract to turn off the creation and trapping of the region of separated, vortical flow 150, as shown in FIGS. 6A and 6B. For a more particular embodiment, the method further includes reinitiating the creation and trapping in preparation for a landing operation of the aircraft. For example, creation and trapping of a region of separated, vortical flow 150 is reinitiated at a preset altitude in preparation for landing the aircraft. The preset altitude may be the same or may differ from the predetermined altitude. Reinitiation of the creation and trapping of the region of separated, vortical flow 150 is achieved, for example, using actuation means 152 or iris diaphragms 12. Beneficially, these embodiments of the method can be used to achieve engine inlet noise reduction during desired portions of the flight, while permitting normal engine performance during the remainder of the flight.

A fluidic method embodiment, for actively changing an effective flow-through area of inlet region 110 of aircraft engine 120, is described with reference to FIG. 7. As indicated in FIG. 7, the fluidic method includes blowing a stream of air into airflow passage 114 at a blowing position 103, to generate a fluidic obstruction to the airflow through airflow passage 114 and create a region of separated vortical flow 150 in airflow passage 114. The method further includes applying suction to the airflow in airflow passage 114 downstream from blowing position 103 to reattach, trap and control the region of separated vortical flow 150 to protect a number of fan blades 142 from the impingement of the separated, disturbed airflow. Beneficially, the region of separated, vortical flow 150 partially obstructs the main inlet airflow, thereby reducing the effective flow-through area and increasing the local Mach number for inlet region 110. This increase in local Mach number, in turn, reduces the engine inlet noise.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An active effective flow-through area control system comprising an upstream wall-flow perturber and a downstream wall-flow perturber situated in an inlet region of an aircraft engine, said downstream wall-flow perturber being positioned downstream from said upstream wall-flow perturber, and said upstream and downstream wall-flow perturbers being configured to generate and trap at least one region of separated vortical flow in the airflow through the inlet region.

2. The active effective flow-through area control system of claim 1, wherein each of said upstream wall-flow perturber and said downstream wall-flow perturber comprises a deployable obstruction.

3. The active effective flow-through area control system of claim 2, further comprising a suction system positioned in the inlet region of the aircraft engine downstream from said downstream wall-flow perturber, said suction system being configured to apply suction to the airflow in the inlet region downstream from said downstream wall-flow perturber to control the region of separated vortical flow.

4. The active effective flow-through area control system of claim 3, further comprising a blowing system positioned in the inlet region of the aircraft engine upstream of said upstream wall-flow perturber, said blowing system being configured to blow a stream of air into the inlet region upstream of said upstream wall-flow perturber.

5. The active effective flow-through area control system of claim 4, wherein said suction system comprises an aspirated section in an inner wall of the inlet region, and wherein said blowing system is configured to blow the stream of air at a variable angle $\alpha$ relative to an inner wall of the inlet region.

6. The active effective flow-through area control system of claim 2, wherein each of said upstream and downstream wall-flow perturbers is configured to extend into the inlet region about two to about ten percent of the radius of the inlet region when deployed.

7. The active effective flow-through area control system of claim 2, wherein each of said upstream and downstream wall flow perturbers comprises at least one baffle.

8. The active effective flow-through area control system of claim 7, further comprising a suction system positioned in the inlet region of the aircraft engine downstream from said downstream wall-flow perturber, said suction system being configured to apply suction to the airflow in the inlet region downstream from said downstream wall flow perturber.

9. The active effective flow-through area control system of claim 7, wherein each of said upstream and downstream wall-flow perturbers comprises an annular obstruction extending from an inner wall of the inlet region, each of said annular obstructions comprising an annular arrangement of at least two baffles.

10. The active effective flow-through area control system of claim 9, wherein each of said annular obstructions comprises an annular arrangement of at least four baffles.

11. The active effective flow-through area control system of claim 2, wherein each of said upstream and downstream wall-flow perturbers comprises an iris diaphragm.

12. The active effective flow-through area control system of claim 11, further comprising a suction system positioned in the inlet region of the aircraft engine downstream from said downstream wall-flow perturber, said suction system being configured to apply suction to the airflow in the inlet region downstream from said downstream wall-flow perturber.

13. A fluidic effective flow-through area control system for an inlet region of an aircraft engine, said fluidic control system comprising:
   a blowing system positioned in the inlet region and being configured to blow a stream of air into the inlet region at an angle relative to an inner wall of the inlet region, to generate a fluidic obstruction to the airflow through the inlet region and generate at least one region of separated vortical flow in the airflow through the inlet region; and
   a suction system positioned in the inlet region and downstream from said blowing system, wherein said suction system is configured to apply suction to the airflow in the inlet region to reattach, trap and control the region of separated vortical flow.

14. The fluidic control system of claim 13, wherein said suction system comprises an aspirated section in an inner wall of the inlet region, and wherein said blowing system is configured to vary the angle at which said blowing system blows the stream of air.

15. The fluidic control system of claim 14, wherein said blowing system comprises a portion of the inner wall of the inlet region, said portion of the inner wall defining a flow-through portion.

16. A variable effective flow-through area inlet of an aircraft engine, said variable effective flow-through area inlet comprising:
   an inner wall defining an airflow passage; and
   an upstream wall-flow perturber and a downstream wall-flow perturber connected to said inner wall, said downstream wall-flow perturber being positioned downstream from said upstream wall-flow perturber, and said upstream and downstream wall-flow perturbers being configured to generate and trap at least one region of separated vortical flow in the airflow within the airflow passage.

17. The variable effective flow-through area inlet of claim 16, wherein each of said upstream and downstream wall-flow perturbers comprises a deployable obstruction.

18. The variable effective flow-through area inlet of claim 17, further comprising a suction system formed in said inner wall downstream from said downstream wall-flow perturber, wherein said suction system is configured to apply suction to the airflow in the airflow passage to control the region of separated vortical flow.

19. The variable area inlet of claim 18, further comprising a blowing system formed in said inner wall and positioned upstream of said upstream wall-flow perturber, said blowing system being configured to blow a stream of air into said airflow passage at an angle $\alpha$ relative to said inner wall.

20. The variable effective flow-through area inlet of claim 18, wherein each of said upstream and downstream wall-flow perturbers comprises at least one baffle, said at least one baffle being actuated for switching between an active and an inactive position.

21. The variable effective flow-through area inlet of claim 20, wherein each of said upstream and downstream wall-flow perturbers comprises an annular obstruction extending from said inner wall, each of said annular obstructions comprising at least two baffles, and each baffle being actuated for switching between an active and an inactive position.

22. The variable effective flow-through area inlet of claim 18, wherein each of said upstream and downstream wall-flow perturbers comprises a iris diaphragm, each of said iris diaphragms being configured for opening and closing.

23. A variable effective flow-through area inlet of an aircraft engine, said variable effective flow-though area inlet comprising:
   an inner wall defining an airflow passage;
   a blowing system formed in said inner wall and configured to blow a stream of air at an angle $\alpha$ relative to said inner wall into said airflow passage, to generate at least one region of separated vortical flow in said airflow passage, said blowing system being further configured to vary the angle $\alpha$ at which the stream of air is blown; and
   a suction system formed in said inner wall downstream from said blowing system, wherein said suction system is configured to apply suction to the airflow in the airflow passage to reattach, trap and control the region of separated vortical flow.

24. A method for actively changing an effective flow-through area of an inlet region of an aircraft engine, said method comprising:
   creating at least one region of separated vortical flow in an airflow passage, the airflow passage being defined by the inlet region; and
   trapping the region of separated vortical flow in the airflow passage, wherein the region of separated vortical flow partially obstructs a main inlet airflow.

25. The method of claim 24 further comprising applying suction to the airflow downstream from a point of flow separation to reattach and control the region of separated vortical flow and protect a plurality of fan blades from the impingement of a disturbed airflow, the fan blades being positioned downstream from the inlet region in the aircraft engine.

26. The method of claim 25 further comprising blowing a stream of air at an angle $\alpha$ relative to an inner wall of the inlet region, into the airflow passage upstream of a central portion of the region of separated vortical flow.

27. The method of claim 24 further comprising turning off said creating and trapping after one of (a) a predetermined time period has elapsed after a take-off of an aircraft or (b) the aircraft has reached a predetermined altitude.

28. The method of claim 27 further comprising reinitiating said creating and trapping in preparation for a landing operation of the aircraft.

29. The method of claim 27, wherein said creating and trapping of the region of separated vortical flow comprises reducing an effective flow-through area of the inlet region in a vicinity of an area spanning an upstream position and a downstream position, and wherein said turning off step comprises returning the effective flow-through area of the inlet region to an in-flight effective flow-through area in the vicinity of the area spanning the upstream and downstream positions.

30. A fluidic method for actively changing an effective flow-through area of an inlet region of an aircraft engine, the inlet region defining an airflow passage, and said fluidic method comprising:

blowing a stream of air at an angle $\alpha$, relative to an inner wall of the inlet region, into the airflow passage at a blowing position to generate a fluidic obstruction to the airflow through the airflow passage and create a region of separated vortical flow in the airflow passage; and applying suction to the airflow in the airflow passage downstream from the blowing position to trap and control the region of separated vortical flow to protect a plurality of fan blades from the impingement of a disturbed airflow, the fan blades being positioned downstream from the inlet region in the aircraft engine.

* * * * *